(12) United States Patent
Friedl et al.

(10) Patent No.: US 9,551,178 B2
(45) Date of Patent: Jan. 24, 2017

(54) VACUUM INSULATED GLASS HAVING INCREASED STABILITY AND METHOD FOR THE PRODUCTION THEREOF

(75) Inventors: Wolfgang Friedl, Kaisheim (DE); Stephen Leitenmeier, Augsburg (DE); Christian Herfert, Langweid (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 419 days.

(21) Appl. No.: 14/119,726

(22) PCT Filed: May 23, 2012

(86) PCT No.: PCT/DE2012/000549
§ 371 (c)(1),
(2), (4) Date: Nov. 22, 2013

(87) PCT Pub. No.: WO2012/163326
PCT Pub. Date: Dec. 6, 2012

(65) Prior Publication Data
US 2014/0322461 A1   Oct. 30, 2014

(30) Foreign Application Priority Data

May 30, 2011   (DE) ........................ 10 2011 102 843

(51) Int. Cl.
*E06B 3/663* (2006.01)
*E06B 3/66* (2006.01)
(Continued)

(52) U.S. Cl.
CPC ......... *E06B 3/66304* (2013.01); *E06B 3/6612* (2013.01); *E06B 3/6775* (2013.01);
(Continued)

(58) Field of Classification Search
CPC ...... E06B 3/66; E06B 3/6612; E06B 3/66304; Y02B 80/22; Y02B 80/24
See application file for complete search history.

(56) References Cited

U.S. PATENT DOCUMENTS

| 4,132,218 A | 1/1979 | Bennett |
| 5,657,607 A | 8/1997 | Collins et al. |

(Continued)

FOREIGN PATENT DOCUMENTS

| DE | 102007003831 | 7/2008 |
| DE | 102007030031 | 2/2009 |

(Continued)

*Primary Examiner* — Donald J Loney
(74) *Attorney, Agent, or Firm* — Duane Morris LLP; J. Rodman Steele, Jr.; Gregory M. Lefkowitz (57) ABSTRACT

The invention relates to a vacuum insulated glass, which comprises two or more glass plates, which can be evacuated, which are oriented in parallel and which are sealed air-tight at the outer edge, with respect to the interior formed by means of spacers, by means of strip-shaped connecting elements attached to the entire perimeter, in particular metal strips connected to each other in a vacuum-tight manner, having the following features: a) the spacers each comprise at least two segments (7, 9) associated with each other, b) the spacers are arranged on closed distribution lines, which are arranged at a distance from each other and extend substantially parallel to the perimeter of the glass plate in question and run out in a defined manner in a curve in the corner regions of the glass plate, c) the segments (7, 9) are made of different materials, and d) the segments (7, 9) have a coating and/or structuring on the surfaces that do not come in contact with the glass plates (5, 6). The invention further relates to a method for producing the vacuum insulated glass.

8 Claims, 8 Drawing Sheets (51) Int. Cl.
*E06B 3/673* (2006.01)
*E06B 3/677* (2006.01)

(52) U.S. Cl.
CPC .......... *E06B 3/67326* (2013.01); *Y02B 80/24* (2013.01); *Y10T 29/49826* (2015.01)

(56) References Cited

U.S. PATENT DOCUMENTS

| | | |
|---|---|---|
| 5,664,395 A | 9/1997 | Collins et al. |
| 6,387,460 B1 * | 5/2002 | Shukuri ................ E06B 3/6612 428/34 |
| 6,479,112 B1 | 11/2002 | Shukuri et al. |
| 7,306,833 B2 | 12/2007 | Martin et al. |
| 2008/0245011 A1 | 10/2008 | Friedl |
| 2013/0140347 A1 | 6/2013 | Friedl et al. |

FOREIGN PATENT DOCUMENTS

| | | |
|---|---|---|
| EP | 1004552 | 5/2000 |
| JP | 2002226238 | 8/2002 |
| WO | 01/12941 | 2/2001 |
| WO | 2009/062557 | 5/2009 |

* cited by examiner

Fig. 4

VACUUM INSULATED GLASS HAVING INCREASED STABILITY AND METHOD FOR THE PRODUCTION THEREOF

CROSS-REFERENCE TO RELATED APPLICATIONS

This application is a §371 national stage entry of International Application No. PCT/DE2012/000549, filed May 23, 2012, which claims priority to German Patent Application No. 10 2011 102 843.2 filed May 30, 2011, the entire contents of which are incorporated herein by reference.

The present invention relates to a device and a method for increasing the stability of vacuum insulated glass, also abbreviated to VIG.

A problem with these VIG panes is the production of a bordering bond which is stable over a long period of time and provides a sufficiently tight seal with respect to a high vacuum. The glass-glass connection by glass solder previously used in practice in vacuum insulated glass is not considered here since this bordering bond is rigid, and, in the case of the previous methods, it is thus not possible to achieve relatively large geometrical dimensions of the panes combined with simultaneously good thermal insulating values.

A glass-metal-glass connection is aimed for since these two materials allow a flexible gas-tight bond which is suitable for high vacuums. Basic methods for producing such glass-metal connections are for example ultrasonic welding, ultrasonic soldering, the various possibilities of a pressure-diffusion connection or the use of glass and metal solders in conjunction with coatings on the glass and/or the metal.

Another problem with VIG panes is the evacuation of VIG panes.

Thus, DE 10 2007 030 031 B3 discloses a thermal insulating glazing element which comprises a glass plate arrangement having at least two glass plates which have predetermined mutual spacings, wherein intermediate spaces which can be evacuated are formed between the glass plates. This element also comprises a spacer device which is designed to set the spacings of the glass plates and has a border sealing device which is designed to seal the intermediate spaces between the glass plates with respect to the surroundings of the glazing element with a border sealing material.

Furthermore, in this case, there is at least one evacuation opening which is designed to produce an internal pressure, which is reduced with respect to the surrounding pressure, and contains an evacuation tube.

To achieve the object of affording an improvement with respect to the disadvantages in the prior art, that document claims a particular evacuation tube in which a metal sealing element is arranged which is designed for the vacuum-tight closure of the evacuation tube. No further information is given with respect to the spacer device.

DE 690 26 264 T2 discloses a method for producing a thermally insulating glass panel which has two glass panes which are arranged at a spacing from one another and which enclose a vacuum space and are connected to one another by a peripheral border of molten solder glass and an arrangement of supports, wherein the method comprises the production of the vacuum space by means of the following steps:

1) the provision of an evacuation means for connecting the interior to the exterior of the panel, 2) pumping gas from the interior of the panel through the evacuation means, and 3) sealing the evacuation means after the vacuum space has been produced in the interior of the panel, with the result that the sealed evacuation means substantially does not project beyond the nominal dimensions of the panel.

With regard to the structural design of the spacers of the glass panes, referred to here as support pillars, this document only reveals that these pillars should be as small as possible and should be arranged as closely as possible to one another. The basic constellation proposed for the grouping of the pillars is a square grouping.

The object on which the invention is based is to specify a vacuum insulated glass and a method for the production thereof which allows a higher stability in view of the thermal stressing of such an insulating unit.

This object is achieved by the embodiments of the device as described herein.

This solution substantially comprises avoiding or reducing thermally induced stresses on the vacuum insulated glass by means of design measures.

The device according to the invention is described in more detail below. In the figures, specifically.

Figure 1:
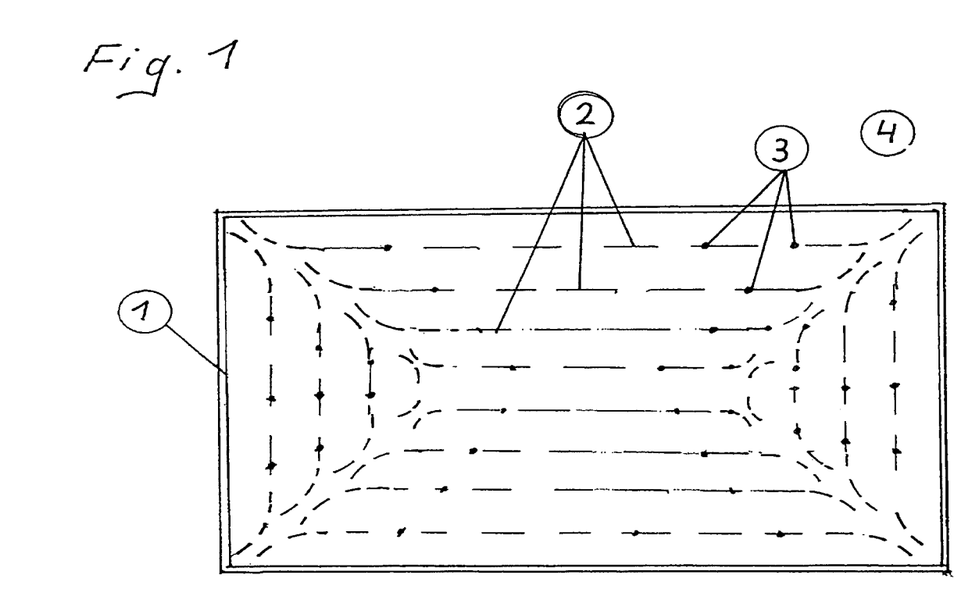
FIG. 1: shows a representation of the distribution lines according to the invention of spacers

FIG. 1 shows a representation of the distribution lines 2 according to the invention of spacers on a glass surface 4. The spacers 3 are distributed on these lines according to the pattern indicated. This pattern corresponds approximately to the stress lines which arise when a rectangular glass plate is heavily loaded centrally or in a punctiform manner in the center and thus has a tendency to bend elastically. The lines 2 represented in FIG. 1 and their spacing from one another merely represent the approximate structure of these lines since their spacing from one another and from the border of the vacuum insulated glass depends mainly on the outer dimensions of the respective vacuum insulated glass and on the thickness of the glasses which are used. The spacing of the spacers 3 which are arranged on the lines 2 also depends on the outer dimensions and the thickness of the glasses which are used.

Figure 1A:
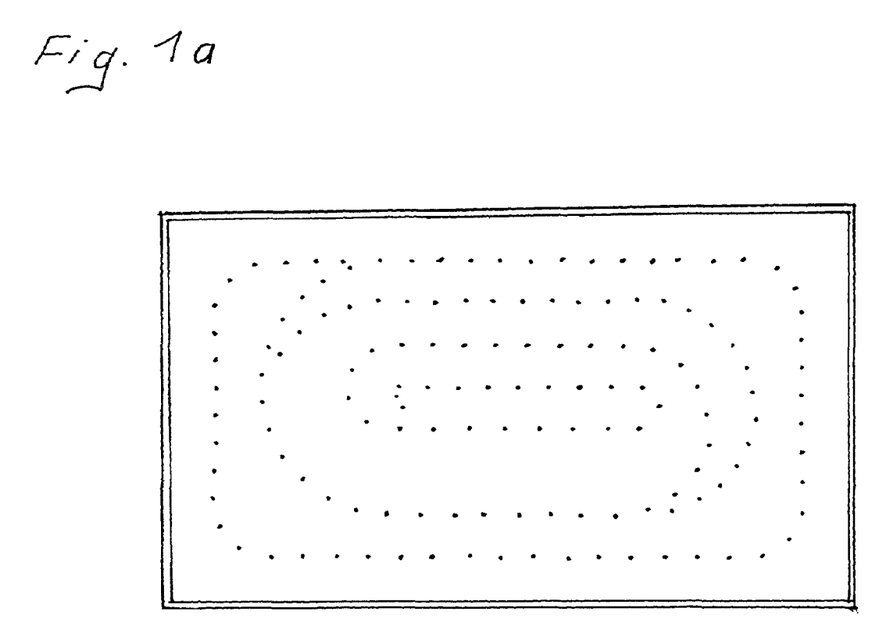
FIG. 1a: shows a particular configuration of these distribution lines

Proposed as a particular configuration of the pattern shown with these structures in the form of lines is the arrangement of the spacers on a spiral closed structure having an elliptical cross section, corresponding to the longitudinal extent of the rectangular glass surface 4 shown, cf. FIG. 1a in this respect. This pattern arises when the lines extending in parallel according to FIG. 1 are allowed to merge substantially into one another to a certain extent.

This ensures that, by means of the line, which extends in a self-enclosed manner and which can be assigned to the positions of the spacers arranged in this manner, the tangential stresses in the glass surfaces 4 involved can be further reduced.

Figure 2:
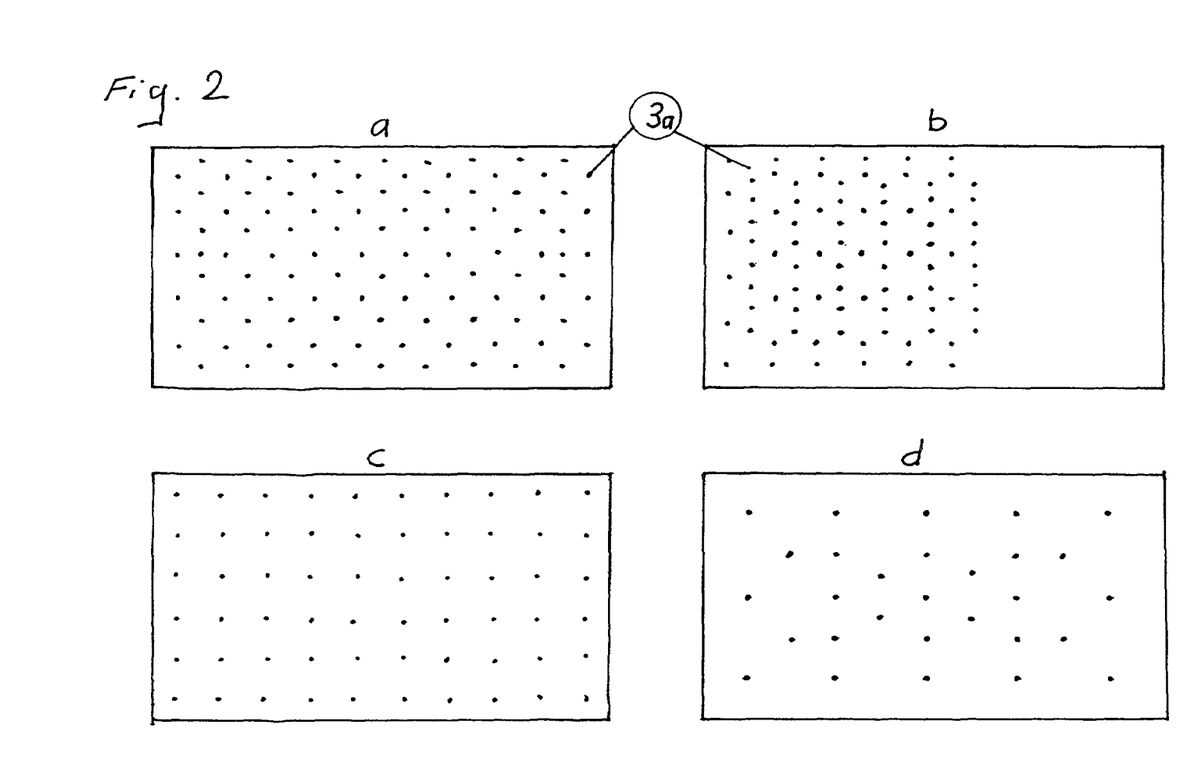
FIG. 2: shows a representation of customary types of distribution of spacers

FIG. 2 shows a representation of customary types of distribution of spacers.

Figure 2A:
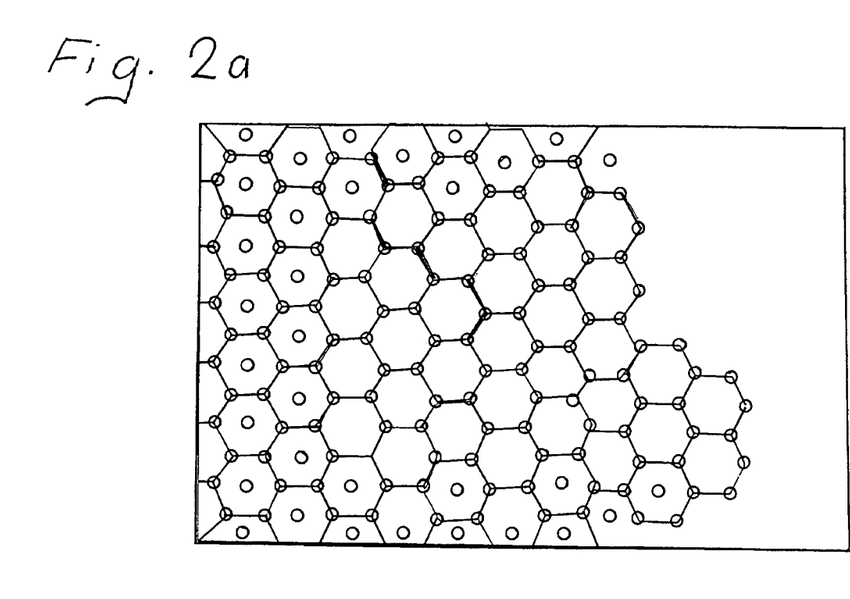
FIG. 2a: shows a further distribution according to FIG. 2

Thus, in FIG. 2a, by virtue of the structure, a system of square arrangements of spacers 3a can be seen which serve as fixed points, wherein the diagonals of the respective squares are oriented parallel to the outer edges of the glass plates. In FIG. 2b, the spacers 3a are arranged with alternating density distribution parallel to the narrow side of the rectangular glass plate. In order to show this system more clearly, this distribution has only been represented up to the center of the figure.

In FIG. 2c, the spacers 3a are distributed over the entire glass plate in regular lines extending parallel to the outer edges.

In FIG. 2d, substantially the same structure of the arrangement of the spacers 3a, as in FIG. 2b, can be seen, but with a greater spacing of the individual spacers from one another.

FIG. 2a represents a further customary form of the distribution of spacers which is substantially based on the arrangement in hexagonal structures.

An advantageous arrangement of the spacers according to the invention is revealed from the combination of the distribution lines according to FIG. 1, or FIG. 1a, and from the arrangement of the spacers in hexagonal structures, as are shown in principle in FIG. 2a. To each point of the points shown in FIGS. 1 and 1a there corresponds in this case a hexagonal structure of six spacers which are arranged corresponding to the spiral distribution lines. The size ratios of the hexagonal structures and the respective vacuum insulated glass panes have to be seen in a necessarily distorted manner in these representations. The arrangement of these spacers can be effected here in such a way that no spacer is arranged in the center, or the center has an additional spacer. It is particularly advantageous in this case if arrangements of hexagonally arranged spacers with a central spacer are used at the border of the respective vacuum insulated glass pane, while in the region of the center of such a pane only such hexagonal arrangements are used without a central spacer.

Figure 3:
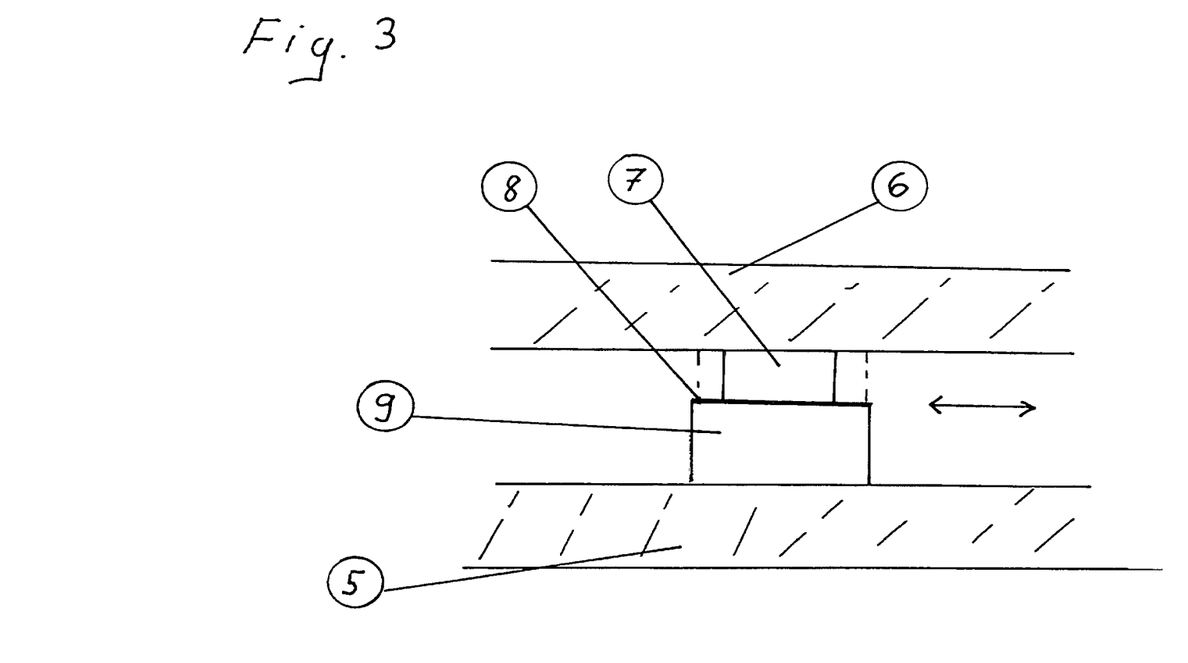
FIG. 3: shows a side view of a spacer according to the invention

FIG. 3 shows a side view of a spacer 3 according to the invention. In this case, a distinction is made between the outer glass 5 and the inner glass 6. Because vacuum insulated glass is used in most cases for the glazing in house building, the term inner glass here refers to the fact that this glass surface faces the living space. It is correspondingly meant that the outer glass 5 is exposed to the requirements of the temperature fluctuations which occur.

What is essential in the construction of this spacer is that it comprises at least one areally larger spacer support 9 and an areally smaller spacer slider 7. The spacer support 9 here has a sliding surface 8 on which the spacer slider 7 can move in all directions on the bearing surface of the spacer support 9. The division into two of this specific spacer 3 not only meets the function that, under thermally induced stresses, the outer glass 5 can move relatively independently of the inner glass 6 insofar as the border seal allows this.

In addition, this division of the spacer 3 into two allows the possibility that, by the targeted selection of the thermal conductivity of the spacer support 9 and the spacer slider 7, the heat transmission at the location of the spacer 3 can be reduced. In the case of FIG. 3, an optimally low heat transmission coefficient therefore must be selected for the spacer support 9 bearing on the outer glass 5, wherein its larger bearing surface shown can be influenced with respect to the thermal conductivity at this location by a corresponding selection of material. In order to avoid damage, it is preferable to choose for both parts of a spacer 3 materials whose hardness is smaller than that of the respectively bearing glass surfaces 4. The sliding surface 8 can be used for example for the application of getter material 10. For this purpose, in a particular configuration the spacer support 9 can be chosen such that the sliding surface 8, for the application of getter material 10, is designed to be larger than appears necessary for the expected working region of the spacer slider 7. Preferably, the spacer support 9 and the spacer slider 7 can also have a comparably identically large base surface since the expected displacements of both glass surfaces 4 involved should not exceed the diameter of such a base surface.

It is of course also possible to produce from the vacuum insulated glass according to the invention elements consisting of a plurality of such VIGs.

The division according to the invention of the spacers 3 into a plurality of segments is not restricted to two segments 9, 7. Additional segments can serve, for example, within the scope of the available spacing of the glass surfaces 4, to further reduce the thermal conductivity at the respective location of a spacer 3 or to achieve intended optical effects, cf. in this respect FIG. 3a as a design form with 3 segments.

Figure 3A:
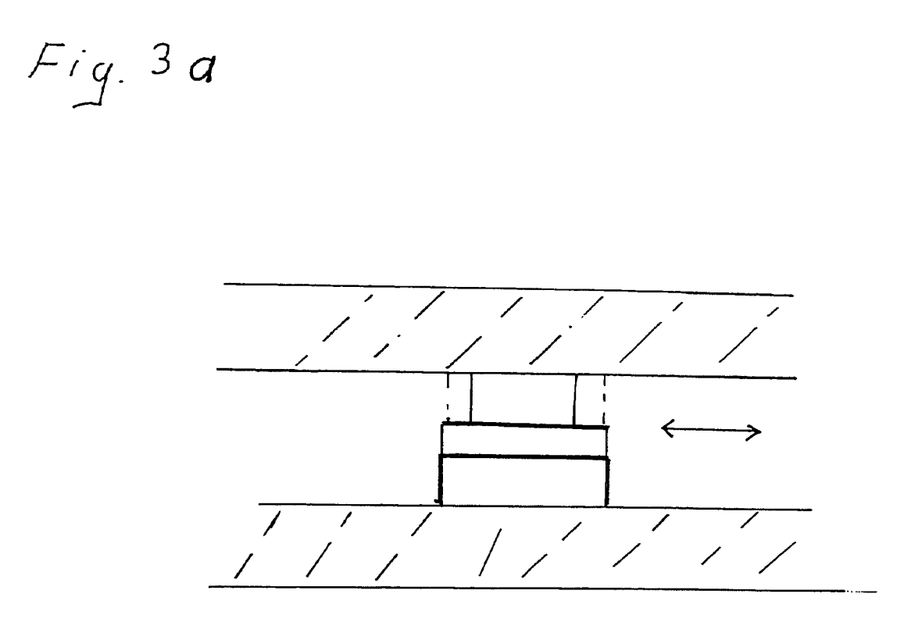
FIG. 3a: shows a further design form of a spacer having three segments

The contact surfaces, or sliding surfaces 8, between the respective segments can in this case be coated corresponding to the respective intended use. The intended use can be to achieve a certain temperature behavior and/or a certain sliding behavior of the segments situated on one another.

As a particular configuration, the sliding surfaces 8 respectively situated on one another can have a specific sliding behavior. This sliding behavior can be realized by a certain different or else identical roughness of the surfaces of the respective segments which slide on one another. In this way, it is not only possible to produce a settable coefficient of friction between the respective segments, but also to have the effect that both segments slide on one another over a certain distance and then mutually latch such that they are fixedly connected on one another. This is achieved for example in that the roughness depth which is set on both segments and is different in form and target direction allows a sliding friction over a certain distance, but then leads necessarily to a latching of the segments since the roughness parameters which determine the respective roughness depth have been correspondingly chosen.

New ways are used for fixing the spacers 3. While in the case of earlier solutions the spacers 3 were fixed on a pane by an adhesive, such as for example sodium silicate, here it is possible to dispense with the use of adhesive. During the entire production of the VIG pane, the position of the lower glass plate remains fixedly connected to a plate. Let into this plate are fixing elements, exactly corresponding to the pattern in which the spacers 3 are to be set onto the glass plate. These fixing elements may be, for example, bar magnets (for example NdFeB, SmCo, ferrite) or electromagnets, but other elements which produce a homogeneous or inhomogeneous magnetic or electric field, etc., and thus act on the respectively used spacers 3 through the glass plate by the effect of an attractive or repulsive force, are also possible.

The spacers used here in the example are produced from, or with the addition of incorporated, magnetic or magnetizable material (ferromagnets, antiferromagnets, or ferrimagnets); the fixing elements are axially magnetized cylindrical bar magnets.

By suitable design of the generally inhomogeneous magnetic field by means of a defined arrangement of the fixing elements, in addition to the fixing of the spacers 3 there is also a correct alignment and centering in the intended position.

If, for example, a magnetic cylindrical spacer with magnetic anisotropy, caused for example by a sufficiently great length in comparison with the diameter (shape anisotropy), is brought close to an intended position on the glass surface 4 in any desired spatial orientation, vertically or horizontally, this spacer is drawn to the intended position and stands up perpendicularly on the glass plate over the intended position of the fixing element. The fixing element consists of a bar magnet inserted into the plate on the underside of the glass plate. Therefore, only a relatively inaccurate XY positioning device is required, with which the spacers 3 are distributed simultaneously or in quick succession among the corresponding positions. For this purpose, a mechanical, electrostatic, magnetic or pneumatic gripper may be used, or the spacers may slip through a positionable hose or a tube, or the spacers, or portions thereof, are allowed to fall in a distributed manner through a perforated plate. This distribution, described as the only distribution here, can also be optimized to increase the cycle time by group formation. In that case, for example, a complete row or line is always prepared and set together in sequence.

However, the spacers may also be applied as bulk material.

In the case of multi-part spacers 3, a plurality of segments are set onto one another in the manner described.

In order to design specific partial effects at different locations of a VIG, it is also possible to use spacers 3 of different compositions.

After completion of the VIG pane, the spacers in the vacuum are firmly clamped and fixed between the two glass panes of the vacuum element by the external air pressure. Now, the plate with the bar magnets can then be removed without the spacers slipping.

The advantage of this method lies not only in the simplicity achieved regarding the possibility of being able to set many spacers in a high cycle time, but also in the further reduction in the visibility of the spacers 3 as a result of the adhesive no longer being needed in this case.

New ways have in turn been used for supplying the spacers 3. While the previous solutions individually take previously ready-made spacers 3 as spheres, cylinders, disks, springs or rings of ceramic and/or metal from a stock of material and then feed them into the support setter, here the spacers 3 are produced in step with the cycle time of the automatic setting unit.

In a first variant, the spacers 3 are punched out from a metal strip, fed in from the roll, by a tool, for example a punch. Directly from the punch, the spacers 3, or portions thereof, then fall for example through X/Y-positioned hoses to the setting-up location over the fixing element.

In a second variant, the spacers 3, or portions thereof, are cut to length from a wire fed in from the roll, for example by a saw or a cut-off wheel, and then likewise individually positioned further with respect to the setting-up location.

There is also provided the alternative of producing the spacers from a stock of material by means of a suitable laser system for separating or cutting materials. This is particularly advantageous when the spacers have complex geometries.

There is also additionally the possibility of providing spacers 3, or portions thereof, which are not made of magnetic or magnetizable material, with an electroplating.

As a particular embodiment, for example, the surfaces of the spacers 3 which come into contact with a glass surface can be provided with an additional insulating layer. This insulating layer can be applied by a structuring in the form of an embossing or etching.

Independently of the above-described fixing of the spacers 3, it is possible, for example, for their spacer supports 9 to be fixed with an adhesive and for the associated spacer sliders to be set on. Here, for example, getter material can be applied as a type of fixing means.

Figure 4:
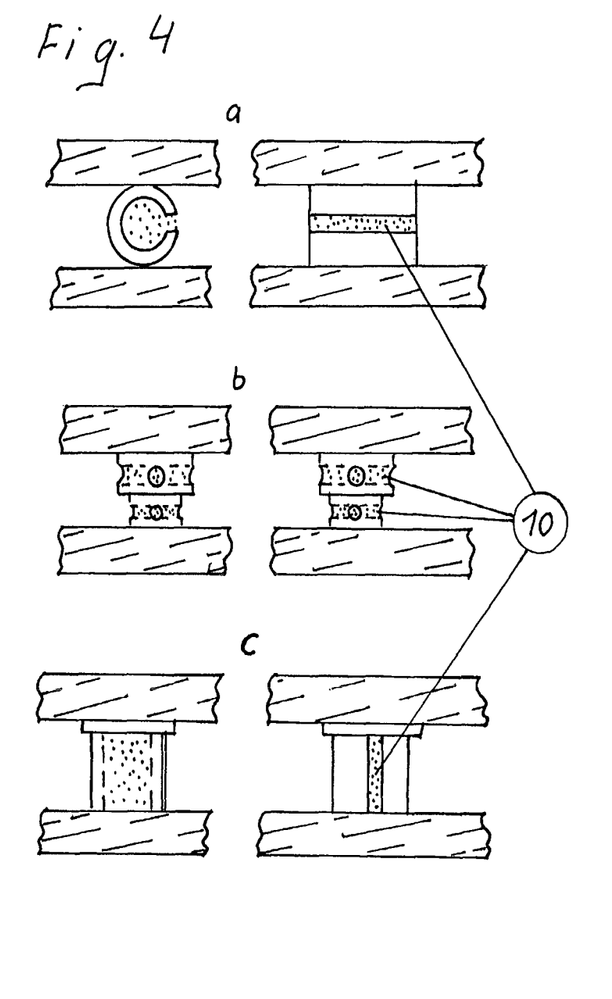
FIG. 4: shows various embodiments of spacers according to the invention

FIG. 4 shows various embodiments of spacers.

In example a of FIG. 4, the spacer 3 chosen is in the form of a hollow cylinder slit open on the longitudinal side. This design form ensures, in addition to the spacing determined by the selected diameter of the hollow cylinder, also an elasticity function between the glass surfaces 4 within certain limits. This means that suddenly occurring strong impacts or pressure peaks on the vacuum insulated glass are as it were cushioned without harming the inner surface of the respectively bearing glass surface 4 and thus providing a cause for a subsequent breakage. It is additionally ensured by means of the rounding of the surface of the hollow cylinder considered that both glass surfaces 4 which bound the vacuum insulated glass can be displaced with respect to one another with low friction and thus the glass plates can be adapted more easily to different thermal loads. A further advantage of the design form of a spacer 3 shown here is that a particularly large amount of getter material 10 can be accommodated particularly easily in its interior.

A fluid or a gas can also preferably be situated in the interior of the spacers, wherein the respective filling openings are tightly closed after the filling operation. This measure increases the plastic and elastic behavior of the spacers 3 and thus reduces the mechanical loading. Moreover, such a measure reduces the sound transmission, and the stability, precisely in the case of very large-area vacuum insulated glasses, and the temperature behavior are improved.

In example b of FIG. 4 a specific design form of the spacer according to FIG. 3 is represented. It can be seen here that the respective spacer, represented in two cross sections, in the form of two cylinders of different diameters standing on one another, has bores which are filled with getter material and have openings which emerge radially into the space of the vacuum.

In example c of FIG. 4, a variant of the design form according to example a is shown in which the hollow cylinder, which is slit on a longitudinal side, is arranged so as to stand perpendicularly, wherein the entire spacer is also in this case divided into two by the attachment of an additional spacer.

Figure 5:
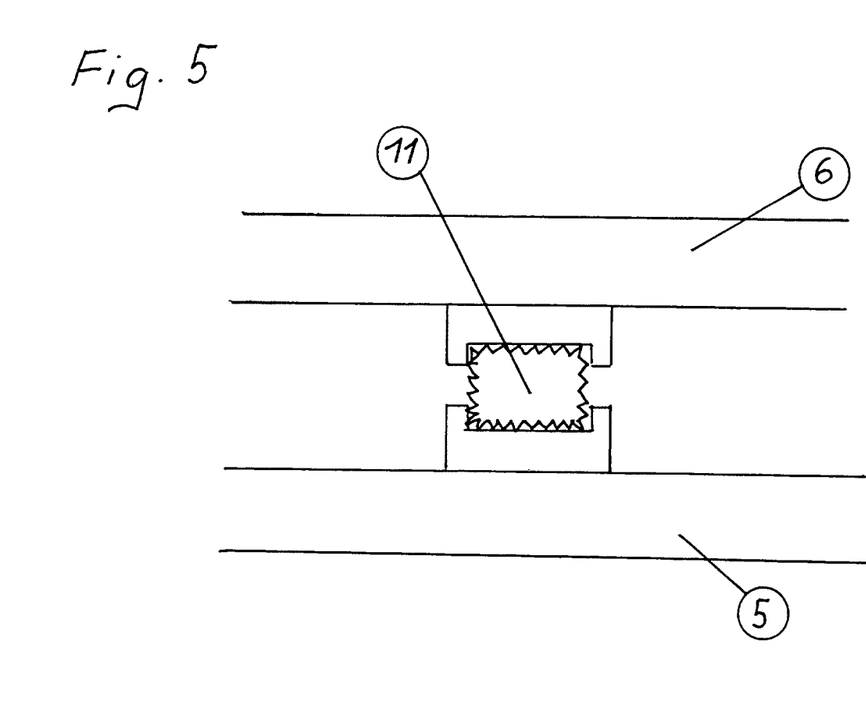
FIG. 5: shows a further embodiment of spacers

FIG. 5 shows a particular variant of spacers 3, comprising 3 components, in which the central connecting element 11 is fitted between the two segments in such a way that, although it is fixedly inserted into the two mounts shown, it can move minimally. This fact is represented by means of the surface jags shown.

The materials which are preferably suitable for the production of spacers 3 according to the invention are amber, alpha-heminitrate and sintered material. The sintering of materials suitable for this purpose is preferably carried out with substances which, after sintering, display a positive effect for the stability, the resonant damping and the temperature behavior.

The proposed measures according to the invention ensure that the thermal stresses on a vacuum insulated glass unit are substantially reduced in each case not only as individual measures but also as a combination of such measures. This leads in any event to an increase in the service life of such a unit.

The complex control of the movement sequences described requires a special control program.

LIST OF REFERENCE SIGNS

1 Vacuum-tight frame
2 Distribution lines
3 Spacer
3a Fixed points
4 Glass surface
5 Outer glass
6 Inner glass
7 Spacer slider
8 Sliding surface
9 Spacer support
10 Getter material
11 Connecting element

The invention claimed is:

1. A vacuum insulated glass, which comprises two or more glass plates, which can be evacuated, are oriented in parallel and which are sealed in an air-tight manner at the outer edge, with respect to the interior formed by means of spacers that are punched out from metal strips that are strip-shaped and connected in a vacuum-tight manner to one another, wherein the spacers are attached onto at least one of the two or more glass plates via a plurality of fixing elements that each produces one of a magnetic field or an electric field, the spacers having the following features:
   a) the spacers (3) each comprise at least two segments (7, 9) associated with one another,
   b) the spacers (3, 3a) arranged on closed distribution lines (2) which are arranged at a distance from one another so as to extend substantially parallel to the periphery of the glass plate in question, and run out in a defined manner in a curve in the corner regions of the glass plate,
   c) the segments (7, 9) are made of different materials, and
   d) the segments (7, 9) have a coating and/or a structuring on the surfaces which do not come into contact with the glass plates.

2. The vacuum insulated glass as claimed in claim 1, wherein the spacers (3a) are part of a hexagonal structure of spacers (3), wherein these structures are provided in the edge region of the insulated glass with a further spacer (3) arranged in the center of this structure, and wherein, however, this further spacer (3) is absent in the central region of the insulated glass.

3. The vacuum insulated glass as claimed in claim 1, wherein at least one of the segments (7, 9) has, on the surface coming into contact with a glass plate, a coating and/or structuring for increased thermal insulation.

4. The vacuum insulated glass as claimed in claim 1, wherein one of the segments (7, 9) below the sliding layer (8) has a high heat transmitting resistance.

5. The vacuum insulated glass as claimed in claim 1, wherein the segments (7, 9) are chosen with respect to their coefficient of friction in such a way that, even under a high contact pressure, they slide in a defined manner on the sliding surface (8) and can then be blocked in their sliding movement.

6. The vacuum insulated glass as claimed in claim 1, wherein one or more spacers (3), or parts thereof, bear getter material on the inside and/or outside of their surface, or are completely produced from sintered material having a gettering effect.

7. The vacuum insulated glass as claimed in claim 1, wherein one or more spacers (3) comprise more than two segments, wherein these serve to further reduce the thermal conductivity at the relevant location of a spacer 3 and/or to achieve intended optical effects.

8. The vacuum insulated glass as claimed in claim 1, wherein one or more spacers (3) comprise more than two segments, wherein, by structuring in the form of a coating or etching, these experience a special treatment of their surfaces which serve for a desired friction behavior and/or favorably influence the stability and/or elasticity of the vacuum insulated glass.

\* \* \* \* \*